Sept. 16, 1969     H. F. MEYER     3,466,971

TOOL HOLDER

Original Filed Sept. 18, 1963     5 Sheets-Sheet 1

INVENTOR

HENRY F. MEYER

BY Woodling, Krost, Granger and Rust

ATTORNEYS

Sept. 16, 1969  H. F. MEYER  3,466,971
TOOL HOLDER
Original Filed Sept. 18, 1963  3 Sheets-Sheet 3

INVENTOR
HENRY F. MEYER
BY Woodling, Krost,
Granger and Rust
ATTORNEYS

Sept. 16, 1969    H. F. MEYER    3,466,971
TOOL HOLDER
Original Filed Sept. 18, 1963    5 Sheets-Sheet 4

INVENTOR
HENRY F. MEYER
BY Woodling, Krost,
Granger and Rust
ATTORNEYS

Sept. 16, 1969   H. F. MEYER   3,466,971
TOOL HOLDER
Original Filed Sept. 18, 1963   5 Sheets-Sheet 5

INVENTOR
HENRY F. MEYER
BY Woodling, Krost,
Granger and Rust
ATTORNEYS

United States Patent Office 3,466,971
Patented Sept. 16, 1969

3,466,971
TOOL HOLDER
Henry F. Meyer, Liverpool, N.Y., assignors to The Monarch Machine Tool Company, a corporation of Ohio
Original application Sept. 18, 1963, Ser. No. 309,700, now Patent No. 3,316,629, dated May 2, 1962. Divided and this application Feb. 7, 1967, Ser. No. 614,483
Int. Cl. B23c 1/00, 3/00, 7/00
U.S. Cl. 90—11     15 Claims

ABSTRACT OF THE DISCLOSURE

The tool holder may be used with a machine tool and holds any of a number of identical tool adapters, each adapter holding a tool which may be different. The tool holder has particular use with automatic tool changers to axially and rotatively lock the tool adapter in the tool holder by quick and positive action. The tool holder may be an operative rotating spindle in a machine tool. The tool holder includes a chuck receptacle having pivoted latch levers to engage a tool adapter groove with a recess formed by flats on the surface of the groove. The latch levers grip these recess flats to rotatively and axially lock the tool adapter in the chuck receptacle.

RELATED APPLICATIONS

This application is a division of my application Ser. No. 309,700, filed Sept. 18, 1963, entitled Machine Tool Tool Changer, now Patent No. 3,316,629, issued May 2, 1967.

SUMMARY OF THE INVENTION

The invention may be incorporated in a tool holder for a machine tool having a spindle arranged for operative rotation comprising: a chuck receptacle carried by said spindle for operative rotation therewith and having an open face at one axial end thereof to receive a tool adapter, locking means carried within said chuck receptacle, said locking means being carried on said chuck receptacle to permit movement thereof to provide a locked and unlocked position for a tool adapter to be inserted within said chuck receptacle, a locking member in said chuck receptacle and mounted for movement generally parallel to the axis thereof, and motive means acting between said chuck receptacle and said locking member for moving said locking member in a first axial direction to engage said locking means and force said locking means inwardly to provide said locked position and for moving said locking member in a second axial direction to disengage said locking means to provide said unlocked position.

The present invention relates generally to machine tools and more particularly to an improved tool change mechanism for changing a tool at the operating station of a machine.

In a machining operation where a large number of holes must be accurately bored, a jig boring machine is utilized to drill or bore these holes with a high degree of accuracy both as to location and to hole diameter. The use of these boring machines requires time consuming and laborious preparation by highly skilled operators which therefore requires both a large outlay in labor and time of skilled mechanics. Present day computers and programming techniques have helped solve many of the problems in precision machining operations; however, in automatic machining operations, where a minimum amount of supervision is employed, breakdown due to jamming of parts, which may result due to error on the part of the machine operator in set-up of the machine, can have a costly and disastrous effect.

In the present invention there is provided a tool change mechanism readily adapted for automatic or programmed operation and which avoids the problem of manual insertion of tools while permitting rapid removal and insertion of tools at the operating station of a machine tool, such as a boring, tapping, milling or drilling machine.

Accordingly, it is a general object of the present invention to provide a machine tool equipped with an improved tool holder mechanism.

Another object of the present invention is to provide an improved tool adapter for carrying a tool and adapted to be readily inserted and withdrawn in a rotary spindle of a machine tool without jamming.

Yet another object of the present invention is to provide an improved machine tool equipped with a plurality of cutting tools that may be readily inserted or withdrawn in a rotary spindle for performing a variety of machine operations.

In carrying out the present invention, in one embodiment thereof, the machine tool is equipped with a rotary spindle and a plurality of cutting tools adapted to be individually received by the spindle for rotation therewith to perform a machining operation. The cutting tools are mounted in tool adapters which are in turn stored in a turntable so that they may be moved in a circular path to locate the desired tool at a tool change station. At the tool change station, a mechanical tool changer may be operated to remove the desired cutting tool and adapter from the turntable and insert it into the spindle for performing the machining operation. During the machining operation, the tool changer is maintained clear of the cutting tool and spindle at the operating station. When demand is made for a new tool, the tool changer removes the tool from the spindle and replaces the cutting tool on the turntable. The turntable is indexed to bring the next tool, selected by demand, to the tool changing station, where the tool change process is repeated.

In accordance with another feature of the present invention, each tool is mounted in a tool adapter. The tool adapter is tapered and is notched or grooved along the tapered surface to provide opposed oblique plane surfaces. The spindle is provided with a chuck receptacle having a matching taper to receive the tool adapter. The chuck receptacle is provided with a plurality of latches having opposed fitting surfaces which engage the opposed oblique surfaces of the tool adapter when it is inserted in the chuck receptacle to lock and drive the tool and its adapter in place.

Yet another feature of the present invention is the tool changer for transporting the tool and its adapter back and forth from the turntable to machine tool spindle. The tool changer is powered by a fluid motor and comprises tongs having gripping ends which fit into one of the grooves of the tool adapter for transporting the tool to the operating station. The tongs are swung arcuately in a vertical plane and means are provided to open and close the tongs in various planes perpendicular to the vertical plane.

While the specification concludes with claims particularly pointing out and distinctly claiming the subject matter regarding the present invention, it is believed that the invention will be better comprehended from the following description taken in connection with the accompanying drawings.

DETAILED DESCRIPTION

Reference is now made more particularly to the drawings which illustrate, with particularity, the features of the present invention. For convenience, and to avoid confusion, like parts of the various drawings have been identified with like numerals.

Figure 1:
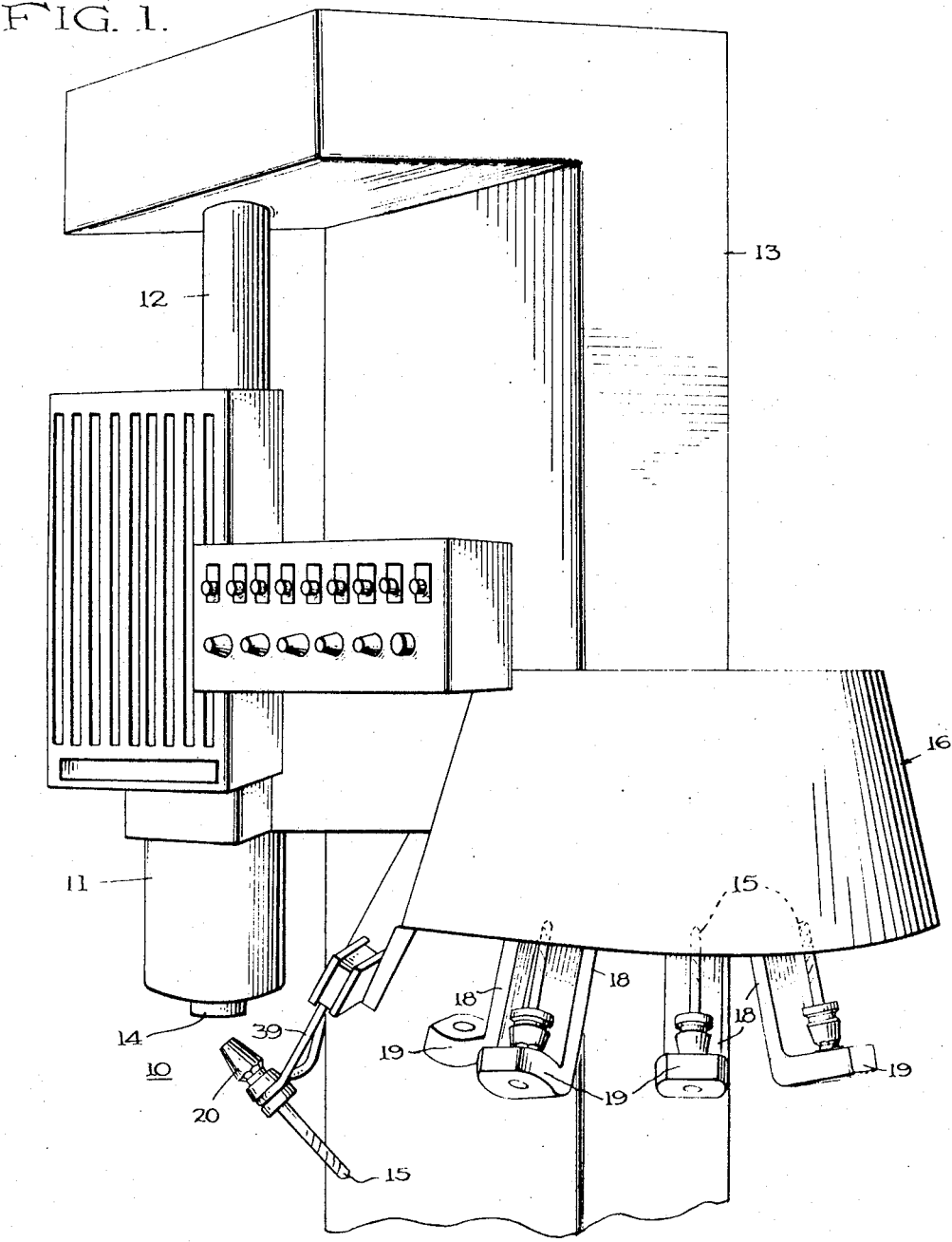
FIGURE 1 is a perspective view of the assembled device illustrating the turntable, tool changer and part of the machine tool.

Referring now to FIGURE 1, there is illustrated, in part, a machine tool incorporating the features of the present invention which are readily adaptable for use with a variety of commercial boring or drilling machines such as, for example, the Edlund Model #2N Edlund-Matic drilling and tapping machine. Such a machine comprises, generally, an operating station 10 at which is located a spindle head or tool head 11 carried on a vertical column 12 supported by the machine frame or body 13 and arranged for movably supporting the spindle head 11 in a vertical path of travel. The spindle head 11 rotatably supports a spindle 14 that is adapted to carry a tool 15 to rotate with the spindle 14 for performing a machining operation. The spindle 14 is rotated in a well known manner by a motor (not shown) and by vertical movement in a downward direction causes the tool 15, when it comes in contact with the workpiece, to perform its machining operation.

Figure 2:
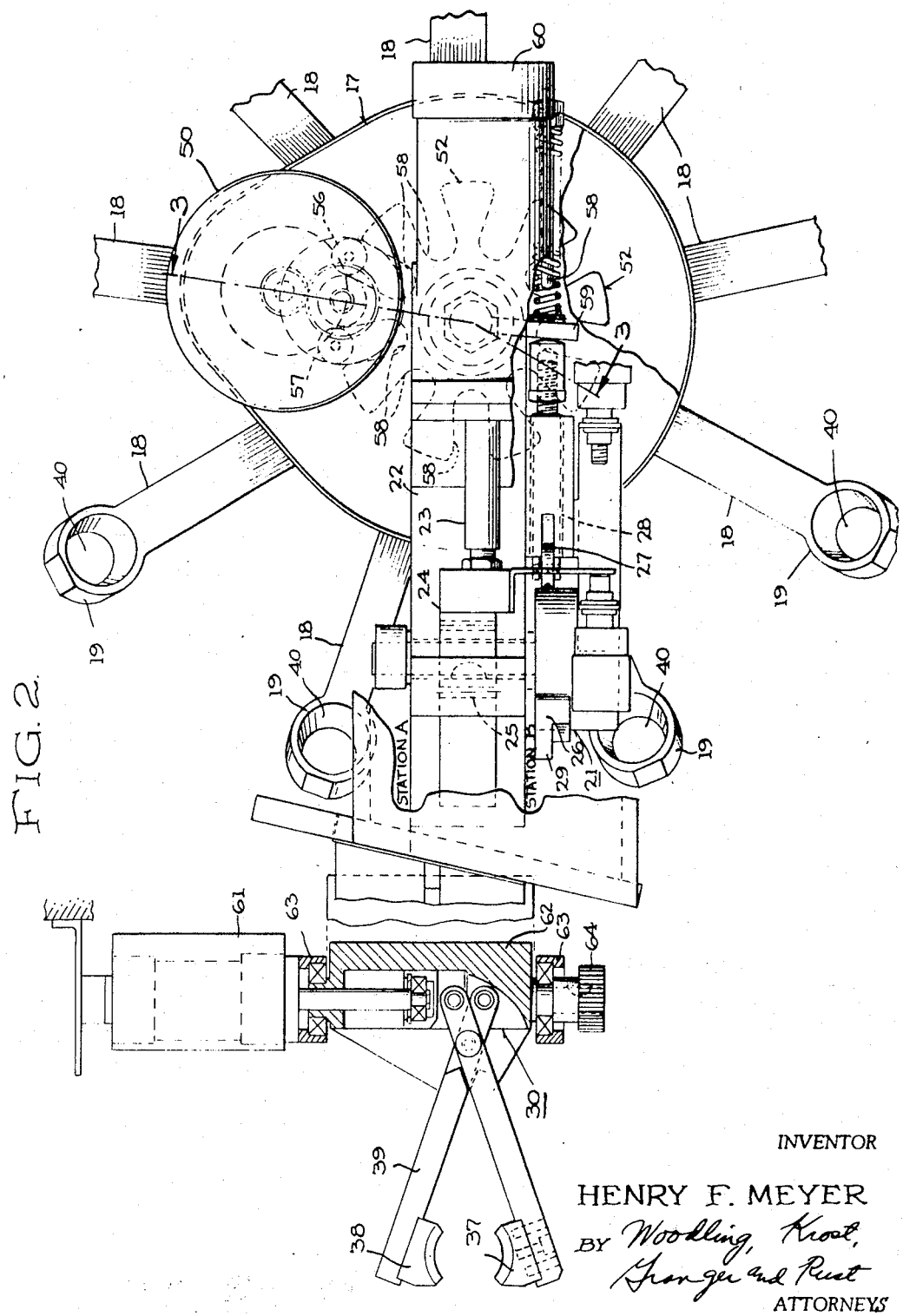
FIGURE 2 is a partial top plan view of the turntable and tool changer.
Figure 3:
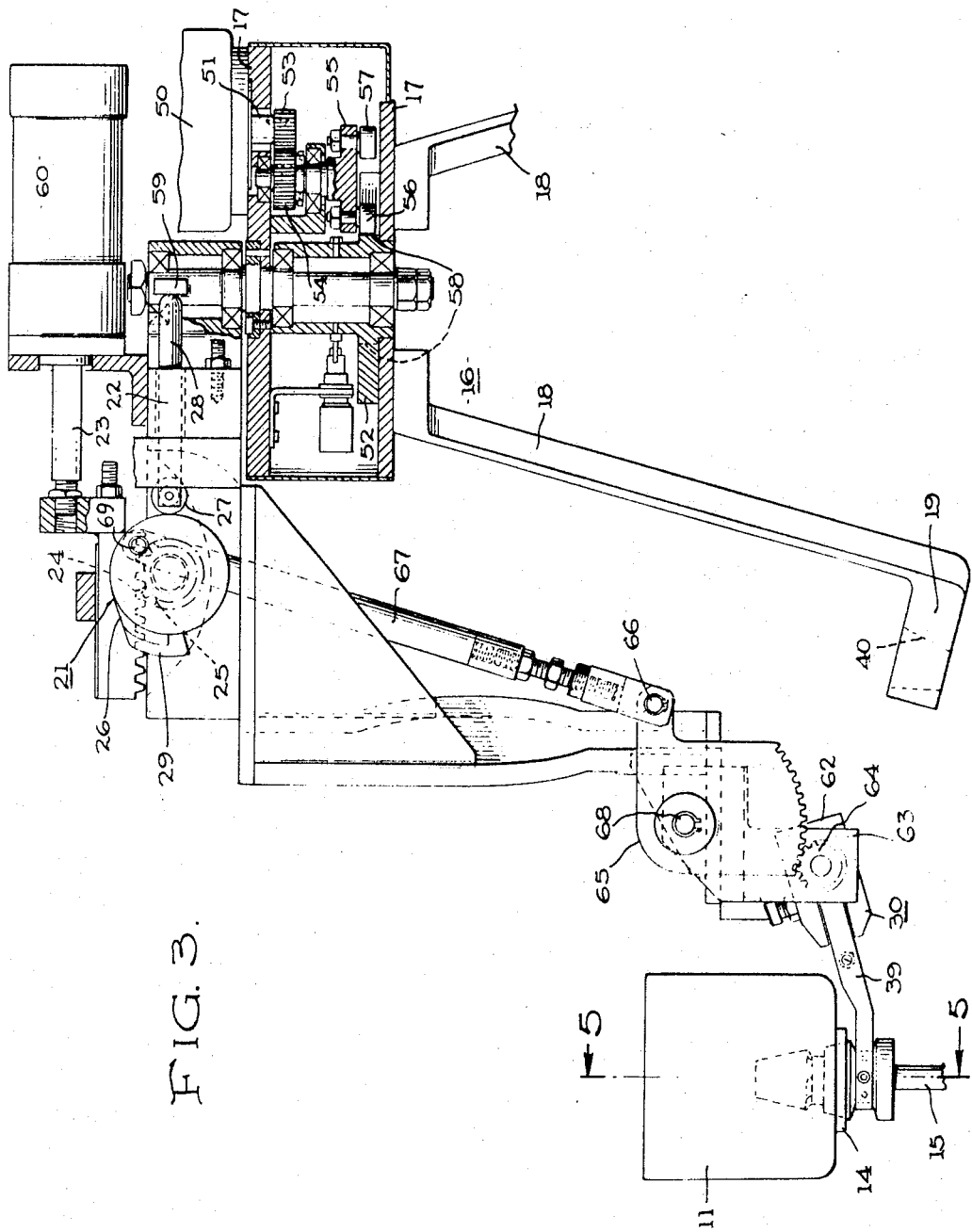
FIGURE 3 is a side elevational view of the parts shown in FIGURE 2.

In accordance with the present invention, the machine tool, illustrated in part in FIGURE 1, is equipped with tool storage means 16 more clearly shown in FIGURES 2–3, which may comprise a horizontally disposed turntable 17 having a plurality of tools 15 arranged in a matrix to thereby provide a number of tool storage positions. While the specific embodiment shown illustrates nine storage positions or stations, it should be readily apparent that any number of storage positions may be provided as long as sufficient clearance is maintained between storage positions to permit withdrawal and replacement of the tools 15 in a manner to be hereinafter described.

The tool storage means 16 serves to carry the variety of tools 15 in storage and to transfer or move selected tools individually to a tool change position or tool ready station where they may be made accessible to a tool change mechanism. For this purpose, turntable 17 has attached thereto, in any suitable manner, a plurality of obliquely extending legs 18 at the extremities of which are secured sockets or receptacles 19 in which the tools are deposited.

The various tools 15 are securely mounted in tool adapters 20, the outer surface of which is tapered at 46. For providing a gripping surface for the tool change mechanism 30, the tool adapter 20 is notched or grooved along the tapered surface at 31, to facilitate gripping by the gripping surfaces or arms 37, 38 of tongs 39 of the tool change mechanism 30. A second groove 34 having a plurality of generally opposed oblique plane surfaces 35 is provided to facilitate operative locking and driving of the tool adapter and tool at the machine operating station.

Both grooves 31 and 34 are circumferential and extend around the periphery of the tapered surface 31, preferably being closer to one end of the tool adapter.

The opposed oblique plane surfaces 35, when the tool adapters 20 are locked in the spindle 14, serve to prevent rotation of the tool adapters 20 when the spindle 14 is rotatably driven and thus permit the tool 15 to be operatively driven and perform its work function. As more clearly shown in FIGURES 5 and 6, there may be provided matching pairs or a trio of oblique plane surfaces 35 which may be, for example, eight in number providing four pairs, or nine in number providing three trios.

To permit the tool adapters 20, in which the tools 15 are mounted to be easily interchangeable, each receptacle 19 has its inner surface 40 formed with a standard steep machine tool taper corresponding to that of the tool adapters 20. The tool adapters 20 are stored in the receptacles 19 and are maintained in place by the fitting tapers 46 and 40 which prevent the tools 15 and their corresponding adapters 20 from falling out of the receptacles 19 due to vibration or jarring.

The turn table is journalled on a mounting plate 47, in turn journalled on a fixed mounting plate 22. For indexing the turntable 17, there is mounted on the fixed mounting plate 22 the tool storage means 16 a motor 50 which is of the slow synchronous stepping type having instant starting, stopping and reversing characteristics connected to a suitable power source (not shown) such as a 100 volt A.C. line. The motor 50 is vertically oriented on turntable 17 and is operatively connected by a shaft 51 to an indexing plate 52. Shaft 51 is provided with a suitable driving gear 53 which meshes with a follower gear 54. Follower gear 54 is operatively connected to disc member or flange 55 which supports a pair of indexing rollers 56 and 57 which extend into cooperative engagement with slots 58 of the indexing plate or Geneva gear 52. Slots 58 are suitably spaced on the indexing plate 52 in accordance with the number of tool holding positions provided. In operation, motor 50 drives the flange 55 and the indexing rollers 56 and 57 so that for every 180 degree turn of the flange 55, the indexing plate 52 is positioned to move to its next station or one tool position.

The indexing of the turntable may be accomplished through a suitable programming system utilizing a memory device such as a perforated tape used in numerical positioning systems. The precise control of the indexing motor 50 for locating the selected tool 15 is accomplished by use of suitable microswitches and switch actuators correspondingly located in accordance with each tool position and which serve to control the activation, inactivation, positioning and rotation of the motor in accordance with the selected program, and turntable 17 is locked in accordance with the selected indexed position by positioning of rollers 56 and 57 in the slots of the indexing plate 52. Many suitable memory controlled program systems are commercially available for programming of machine tools and the present invention is readily adapted for incorporation therewith, the particular electrical connection of the particular circuits being dependent on the individual system chosen.

For effecting transfer of the tool 15 from its stored position on the turntable 17, after it has been selectively indexed, to the spindle 14 of the machine tool and back again, there is provided a tool change mechanism 30 illustrated in FIGURES 2–3. The tool change mechanism is operated by motive means 60 which is, for example, a hydraulic or air cylinder operatively connected to a rack and pinion drive generally illustrated at 21. Cylinder 60 is mounted on mounting plate 22 and has its arm 23 affixed to rack 24 of the rack and pinion drive 21. Operation of cylinder 60 serves to actuate the rack and pinion drive 21 to operate tongs 39 which are swung arcuately in a vertical plane and which open and close in various planes perpendicular to the vertical plane through the action of double acting air cylinder 61.

Tongs 39 are carried on a horizontally disposed rotatable shaft 62 which is carried between bearing or bracket plates 63 depending from mounting plate 22. Rotatable shaft 62 rotates between the bearing plates 63 through the action of gear 64 located on shaft 62 and which is operatively driven by gear segment 65 and crank arm 67 connected by means of pin 66 to gear segment 65 and pin 69 to pinion 25.

Referring to FIGURES 2–3, tongs 39 are illustrated in their closed position for engaging the tool adapters 20 and positioned below the spindle 14 of the operating station 10. Upon energization of hydraulic cylinder 60, arm 23, which is operatively connected to the rack 24 of the rack and pinion drive 21, is retracted. Retraction of arm 23 to the right moves rack 24 horizontally causing pinion 25 to rotate clockwise. Rotation of pinion 25 clockwise effects movement of crank arm 67 in a direction to cause gear segment 65 to first pivot clockwise in FIGURE 3 about shaft 68. The gear segment 65 is ratioed so that upon a relatively small movement of crank arm 67 to bottom dead center, tongs 39 and shaft 62 are rotated counterclockwise approximately 180 degrees.

As the connection 69 of crank arm 67 on pinion 25 approaches its lowermost or bottom dead center position, the movement of crank arm 67 is considerably lessened causing tongs 39 to be positioned intermediate a pair of legs 18 of the storage means 16. Further clockwise rotation of pinion 25 causes the cam surface 26 affixed to the pinion to engage a roller 27 carried by push rod 28. Push rod 28 is arranged to engage a lever arm 59 so that actuation of the lever arm causes relative motion between the legs 18 and tongs 39 so as to position the appropriate receptacle 19 directly under tongs 39. This is effected by having lever arm 59 secured to the turntable mounting plate 47 to arcuately move this plate 47 and turntable about 20 degrees. Upon continued clockwise rotation of the pinion 25 moving pin 69 past bottom dead center, roller 27 is engaged by the extended cam surface 29 which is long enough so as to maintain the turntable in position while the tongs are lowered due to the continuing clockwise movement of pinion 25. As pinion 25 moves pin 69 clockwise past bottom dead center, this pulls upward on the crank arm 69, reversing gear segment to now move counterclockwise. This causes the lowering of the tongues to deposit the tool in the receptacle 19, which is now positioned directly beneath the tongs through the action of cam surface 26 and push rod 28. The tongs 39 are now opened wide to release the grip on the tool adapter 20 and permit turntable 17 to index for the next selected tool.

Opening and closing of the tongs is effected through air cylinder 61. As more clearly shown in FIGURE 4, tongs 39 which are manipulated to grasp the tool adapters 20 in the circumferential groove 31, include a pair of arms 41, 42 pivoted on a pin 43. The inner end of arm 41 is also pivoted on a pin 44 secured to shaft 62, while the inner end of arm 42 is affixed to the piston 45 of the air cylinder 61. Air is supplied to cylinder 61 from a suitable source (not shown), under control of a preselected program, and released through one side of cylinder 61 in a manner well known in the art. Forcing piston 45 in a direction against pin 44 causes arms 41 and 42 to close and grasp a selected tool adapter 20. When piston 45 is moved to the upper most position in cylinder 61, arms 41 and 42 are drawn apart to their outermost extremities to provide clearance for the machining operation. As in the case of indexing of the turntable 17, the direction of rotation, activation and inactivation of the hydraulic cylinder 60 and air cylinder 61 is controlled by circuits activated in response to the system program.

To effect placement of the selected tool 15 in the spindle 14, the rotatable shaft 62 is located in an intermediate position between the tool storage station indexed for tool pick-up and the spindle 14 of the machine tool, so that when the tool 15 and its corresponding adapter 20 are positioned in the spindle 14 and are grasped by the tongs 39, the axis of the tool 15 will coincide with the axis of the matrix receptacle 19. Referring to FIGURE 2, the turntable 17 and the receptacles 19 are shown in the tool transfer position. This position precedes or succeeds a transfer of the tool 15 and tool adapter 20 from or to the machine tool. The tool capturing or tool transfer station of the turntable 17 is an intermediate temporary dwell position between the positions shown in FIGURE 2 and indicated as Stations A and B. With nine stations, the tool transfer station is displaced angularly 20 degrees from the machine operation position of the turntable 17. However, a displacement of the turntable 17 more or less than 20 degrees in either direction may be made, provided only that the displacement is sufficient to provide clearance when the tongs 39 swing the tool 15 and adapter 20 back and forth from the spindle 14 to the tool capturing or tool change station for deposit in the receptacle 19.

Figures 4, 6:
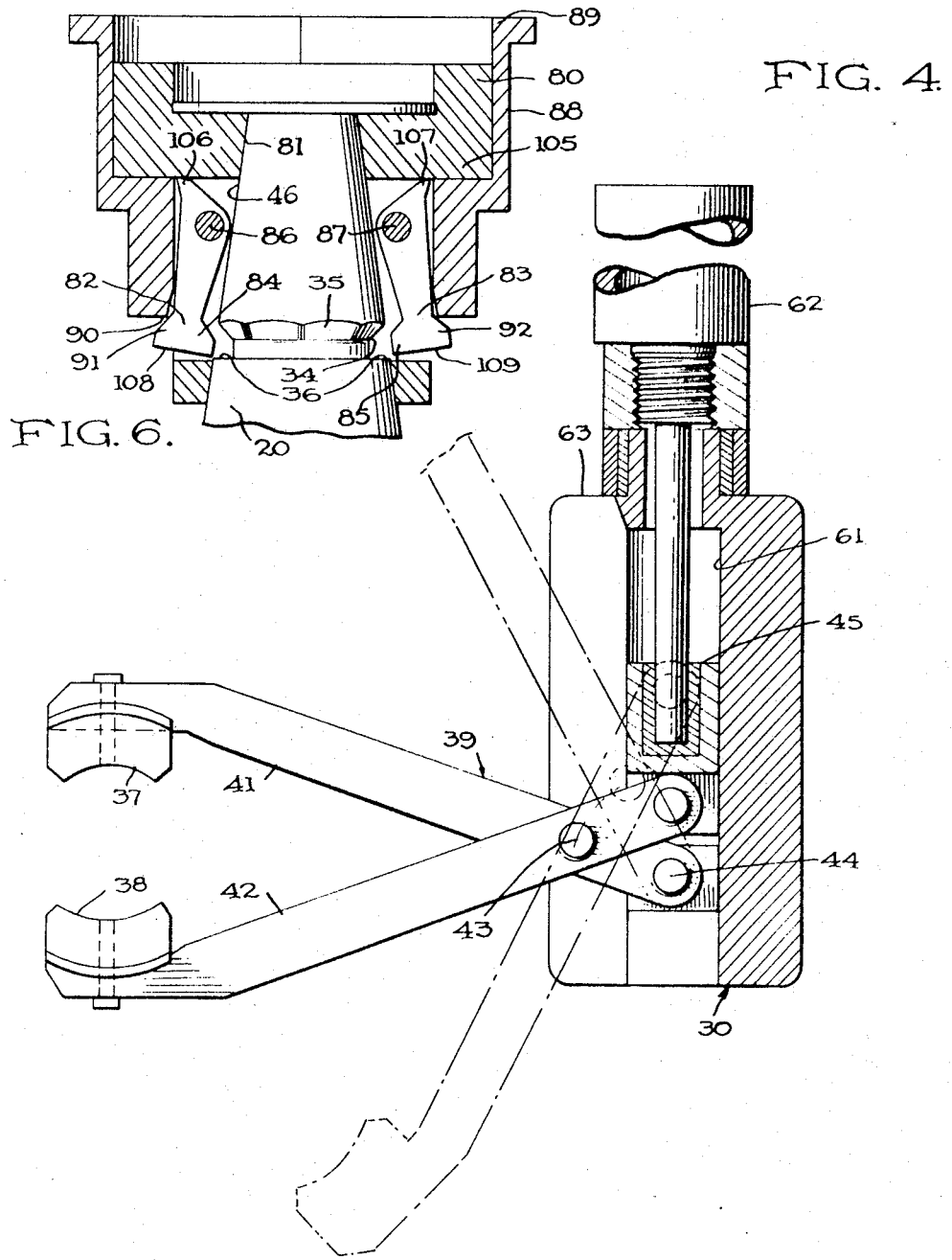
FIGURE 4 is a partial plan and partial cross-sectional view of the tool transferring device.
FIGURES 5 and 6 are partial side elevational views and partial cross-sectional views of the spindle and chuck receptacle taken along line 5—5 of FIGURE 3.
Figure 5:
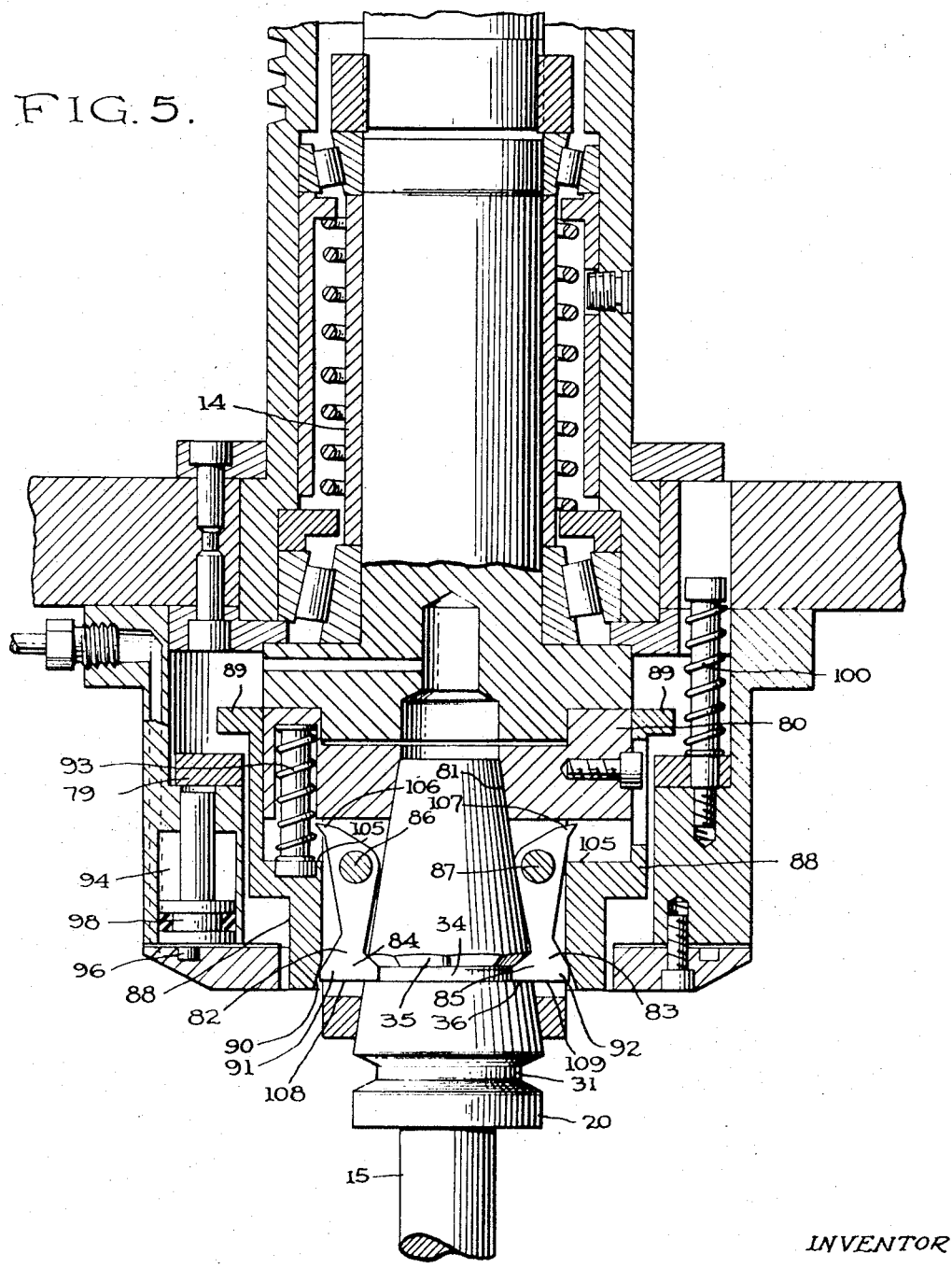

For locking the tool adapter 20 and tool in the mahcine tool in preparation for a machining operation, spindle 14, referring to FIGURES 5 and 6, is provided with a chuck receptacle 80 having an open face at one axial end machined to provide a steep taper 81 which is complementary to the taper surface 46 of tool adapter 20.

Referring to FIGURE 5, there is shown a vertical cross-sectional view through the axis of the machine tool spindle comprising the spindle 14 mounted within a spindle sleeve. Within spindle 14 is mounted the chuck receptacle 80 adapted for receiving the tool adapter 20. At the lower extremity of chuck receptacle 80 is provided locking means, namely a plurality shown as a pair of latches 82, 83 having extending flange portions 84, 85, respectively, which engage the groove 34 of tool adapter 20 when the adapter 20 is inserted into the chuck receptacle 80. The latches 82 and 83 are locking levers and are pivoted at an intermediate point thereof on centers at 86 and 87, respectively, which permit them to be suspended pendulum-like and enter the groove 34. A locking member 88 moves generally parallel to the chuck axis and is shown as a tubular collar 88 having a flange 89. Collar 88 surrounds the chuck receptacle or driven spindle part 80 and is mounted for movement along the axis of the chuck receptacle 80. The inner lower end of the collar 88 is chamfered as at 90 at a small angle to provide a self-holding taper when collar 88 moves in a first axial direction engaging the outer locking surfaces 91, 92 of the first or free ends of latches 82, 83, respectively, and force the matching portions of opposite latches into the groove or recess 34 of the tool adapter 20, so as to cause the free ends of latches 82 and 83 to bear against the oblique plane surfaces 35, thus locking the tool aadapter 20 and tool 15 against turning in the spindle adapter 80. The locking collar is urged in the downward or locked position by spring 93 as part of a motive or biasing means.

The locking means 82, 83 is provided with a locking face which has a component facing radially and axially inwardly. This may be at about a 45 degree angle relative the chuck axis. In the locked position, this locking face of each latch lever 82, 83 engages a single oblique plane surface 35. Each such plane surface is a flat, and is part of the surface means defining a recess in the conical periphery 46 of the adapter 20. Any one of the flats 35 may be engaged by the locking face of the respective locking or latch lever, and thus only a single surface is so engaged. This engagement establishes a locking face to lock the adapter both rotationally and axially in the tool holder chuck receptacle 80. The flats 35 are part of the surface defining the groove 34, and have a component facing axially and radially outwardly.

For the collar 88 in a second axial or unlocking direction to permit removal of the tool adapter 20 from the spindle 14, there are provided in the motive or biasing means several fluid cylinders 94, only one of which is shown, which act against a ring 79. Ring 79 acts against the flange 89 of collar 88 to overcome the downward holding force of spring 93. When collar 88 is pushed upwardly, surface 105 bears against the extending heels 106, 107 on the second ends of latches 82 and 83, respectively, so as to force the free ends of the latches out of the groove 34. Simultaneously, the lower or release faces 108, 109 of latches 82 and 83, respectively, bear against the surface 36 of the groove 34 to push the tool adapter 20 downwardly a small distance to assure that the tapers 46 and 81 are separated so as to facilitate removal of the tool adapter from the spindle.

In removal of a tool 15 and its adapter 20 from the spindle 14 and transporting it to its storage receptacle 19, the end gripping surfaces or members 37, 38 of tongs 39 are caused to move inwardly through the action of air cylinder 61 in a manner hereinbefore described and grip the tool adapter 20 at the groove 31. Immediately thereafter, in accordance with a preselected program control, through port 96 which is located beneath the head of cylinder 94, air is admitted under pressure. Cylinder 94, and other cylinders not shown, when actuated or energized cause their corresponding pistons to raise and overcome the force of spring 100. Continued motion of piston 98 causes engagement with flange 89 thus raising collar 88 until the chamfered surface 90 clears the outer surfaces 91, 92 of latches 82, 83 causing them to be forced outwardly in a manner hereinbefore described. Thus, tool adapter 20 is freed for removal from the chuck receptícle 80 as shown in FIGURE 6.

The tool adapter 20, being released from the chuck receptacle 80, is now ready for return to its storage position in receptacle 19. To accomplish this, the hydraulic cylinder 60 is energized to actuate the rack and pinion mechanism 21 as hereinbefore described.

It should be readily apparent that the above described tool change mechanism is readily adapted for use with a variety of machine tools for rapid positioning of a stored tool from its storage location to an operating position in the machine tool spindle, the overall sequence of steps for transfer of the tool taking approximately five seconds. The following example is illustrative of the operation of the tool change mechanism and illustrates the sequence involved in the tool transfer.

Assuming a tool 15 to be in the spindle and performing a machining operation, a demand for a change is made by a prearranged program, or by suitable switching arrangement at the machine operator's station. Immediately prior to the demand and during the machining operations, the tongs 39 are wide open and at rest as indicated by the dotted lines in FIGURE 4. The empty tool receptacle 19 of the turntable 17 will be at a tool ready station in the position marked Station A. In this position of the matrix, the tools 15 and their adapters 20 can be swung arcuately in a vertical or reference plane between Stations A and B of the matrix and to a position above them for ready transfer by the tool transferring mechanism. After the tool removed from the spindle 14 is swung to the position above the Stations A and B, then cam surface 26 moves the receptacle 19 at Station A into the reference plane beneath the tool to receive it upon subsequent lowering of the tongs 39.

From the foregoing description, it is apparent that there has been provided a tool change mechanism for rapidly and automatically changing tools in a machine tool which is economical in construction and simple in operation and yet provides desired reliability in that it reduces the problems of jamming on separation of the tool from its holder. To this end, there is provided tool storage means wherein the tools are mounted in tool adapters and stored in a matrix on a turntable. The turntable is selectively indexed in order to bring the tools and adapters into position to be selectively captured by tool selection means and moved out of the tool storage means. The tool and adapter are swung through an arcuate path to be positioned within a tool spindle adapter and fastened therein for a machining operation. By reversing the process, the tool and adapter may be rapidly returned to its storage position.

Although particular embodiments of the subject invention have been described, many modifications may be made, and it is intended by the appended claims to cover all such modifications which fall within the true spirit and scope of the invention.

What is claimed is:
1. A tool holder for a machine tool having a spindle arranged for operative rotation comprising:
    a chuck receptacle carried by said spindle for operative rotation therewith and having an open face at one axial end thereof to receive a tool adapter,
    locking means carried within said chuck receptacle and including a lever pivoted at an intermediate point to said chuck receptacle,
    first and second ends on said lever,
    said first end being near said open face of said chuck receptacle,
    a locking face being carried on said lever first end,
    said locking means being carried on said chuck receptacle to permit movement thereof to provide a locked and unlocked position for the tool adapter to be inserted within said chuck receptacle,
    a locking member in said chuck receptacle and mounted for movement generally parallel to the axis thereof,
    said locking face engageable with and establishing a locking force on the locking surface of the tool adapter in both rotational and axially inward directions,
    and motive means acting between said chuck receptacle and said locking member for moving said locking member in a first axial direction to engage said locking means and force said locking means inwardly to provide said locked position and for moving said locking member in a second axial direction to disengage said locking means to provide said unlocked position.

2. The tool holder as set forth in claim 1, including, said locking face having a component facing radially and axially inwardly of said chuck receptacle.

3. The tool holder as set forth in claim 1, wherein said locking face is disposed at approximately a 45 degree angle to said axis in said locked position.

4. The tool holder as set forth in claim 1, including a heel extending outwardly on said lever second end, and said locking member engaging said heel in movement of said locking member in said second axial direction to positively move said lever to said unlocked position.

5. A tool holder for a machine tool having a spindle arranged for operative rotation comprising:
    a chuck receptacle carried by said spindle for operative rotation therewith and having an open face at one axial end thereof,
    locking means carried within said chuck receptacle,
    a tool adapter having a shank insertable in said open face of said chuck receptacle,
    said shank having a circular cross-section periphery,
    surface means of other than a circular cross-section periphery defining a recess in the periphery of said shank to be engaged by said locking means to rotatively and axially lock said adapter in said chuck receptacle,
    said locking means being carried on said chuck receptacle to permit movement thereof to provide a locked and unlocked position for the tool adapter to be inserted within said chuck receptacle,
    a locking member in said chuck receptacle and mounted for movement generally parallel to the axis thereof,
    said locking means having a locking face engageable with and establishing a locking force on the locking surface means of the tool adapter in both rotational and axially inward directions,
    and motive means acting between said chuck receptacle and said locking member for moving said locking member in a first axial direction to engage said locking means and force said locking means inwardly to provide said locked position and for moving said locking member in a second axial direction to disengage said locking means to provide said unlocked position.

6. The tool holder as set forth in claim 5, wherein said surface means is a single surface for a respective locking means, said single surface having a component facing radially and axially outwardly of said chuck receptacle.

7. The tool holder as set forth in claim 6, including said locking face having a component facing radially and axially inwardly of said chuck receptacle to engage said respective single surface of said shank recess.

8. The tool holder as set forth in claim 7, including a circumferential groove on said shank periphery, and wherein said recess single surface is a part of the boundary of said groove.

9. The tool holder as set forth in claim 8, including a series of flats on the boundary of said groove, each flat having a component facing radially and axially outwardly of said chuck receptacle, and any one of said flats being said respective single surface.

10. A tool holder for a machine tool having a spindle arranged for operative rotation comprising: a chuck receptacle carried by said spindle for operative rotation therewith, locking means carried within said chuck receptacle, said locking means including a lever pivoted at an intermediate point thereof on said chuck receptacle to provide a locked and unlocked position for a tool to be inserted within said chuck receptacle, a tubular collar surrounding said chuck receptacle and mounted for movement parallel to the axis thereof, first biasing means engaging said chuck receptacle and collar for biasing said collar to engage a first end of said locking means and force said locking means inwardly to provide a locking position and second biasing means carried by said spindle for overcoming the force of said first biasing means to cause said collar to move along the axis of said chuck receptacle to engage a second end of said locking means and disengage said locking means from any tool to provide an unlocked position.

11. In a machine tool having an operating station and arranged to receive different tools each mounted in a tool adapter and stored at a remote location and arranged to be transferred by a tool changing mechanism to the operating station, the improvement comprising: a tool holder including a spindle and chuck receptacle carried by said machine at the operating station and arranged to receive a transferred tool adapter, a pair of latches carried within said receptacle and pivoted on said chuck receptacle to permit pendulum-like suspension thereof, a tubular collar surrounding said chuck receptacle and mounted for movement parallel to the axis thereof, said collar being flanged at one end and chamfered on its inner surface at the other end, biasing means engaging said chuck receptacle and collar for biasing said collar against said latches to move them inwardly against the transferred tool adapter to operatively lock the adapter in the spindle, and means carried by said spindle having a piston arranged to engage said flange when said means is energized to overcome the force of said biasing means and move said collar chamfer out of engagement with said latches to release the tool adapter for return to the remote location.

12. The tool holder as set forth in claim 5, including a lever pivoted at an intermediate point as said locking means, first and second ends on said lever, and said locking member in movement in said first and second axial directions engaging said first and second ends, respectively, of said lever to positively move same between said locked and unlocked positions.

13. The tool holder as set forth in claim 12, including said locking face being carried on said lever first end, a heel on said lever second end, and said locking member engaging said heel in movement of said locking member in said second axial direction to positively move said lever to said unlocked position.

14. The tool holder as set forth in claim 12, including a release face on said lever, and said release face engaging the tool adapter in movement of said lever towards the unlocked position to positively move the tool adapter axially outwardly of the tool holder.

15. The tool holder as set forth in claim 14, wherein said release face is a flat face generally radially disposed.

References Cited
UNITED STATES PATENTS

| | | | |
|---|---|---|---|
| 2,433,127 | 12/1947 | Kinzbach | 90—11.1 X |
| 3,150,878 | 9/1964 | Buddeneta | 90—11.1 X |
| 3,177,775 | 4/1965 | Alisauskis | 90—11.1 |

LEONIDAS VLACHOS, Primary Examiner

U.S. Cl. X.R.

29—568; 77—60; 279—37